March 31, 1964         W. H. WALKER ETAL         3,126,689
PROTECTIVE DEVICE FOR FARM IMPLEMENTS
Filed March 29, 1962                    2 Sheets-Sheet 1
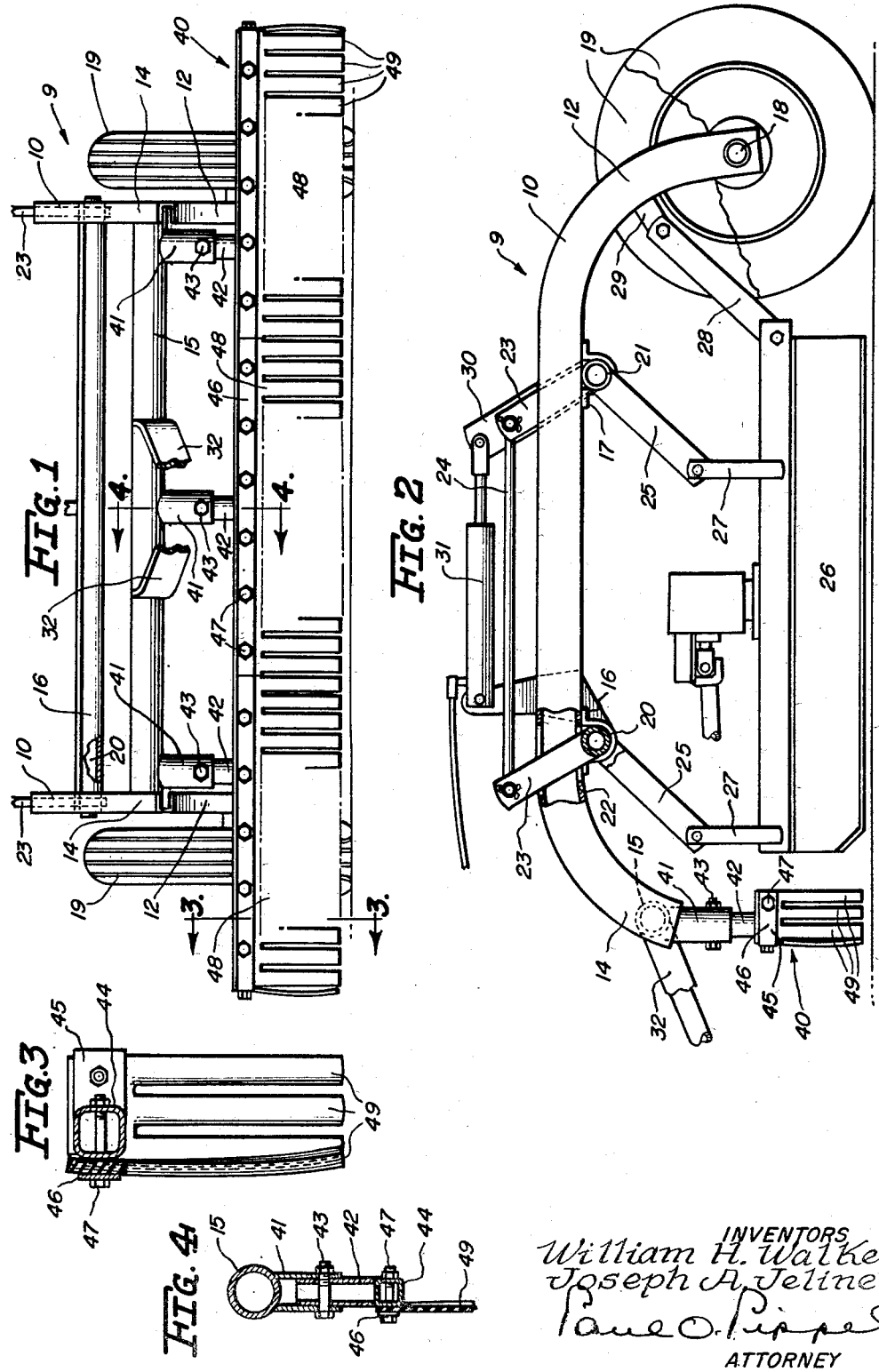
INVENTORS
William H. Walker
Joseph A. Jelinek
Paul O. Pippel
ATTORNEY

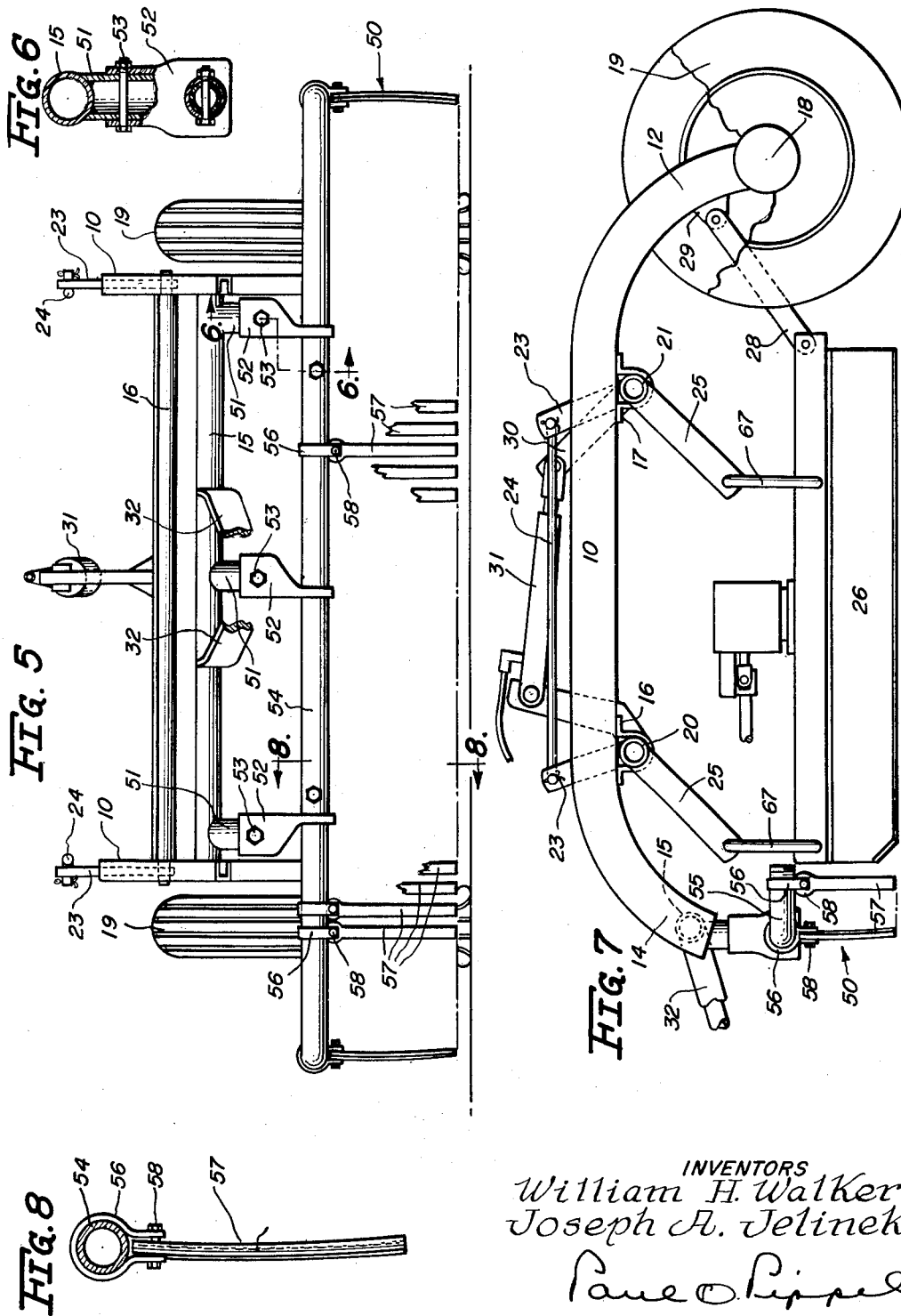

United States Patent Office 3,126,689
Patented Mar. 31, 1964

3,126,689
PROTECTIVE DEVICE FOR FARM IMPLEMENTS
William H. Walker, Clarendon Hills, and Joseph A. Jelinek, Chicago, Ill., assignors to International Harvester Company, Chicago, Ill., a corporation of New Jersey
Filed Mar. 29, 1962, Ser. No. 183,545
1 Claim. (Cl. 56—25.4)

The present invention relates generally to improvements in farm implement suspension devices and more particularly to new and improved suspension devices for implements such as rotary type cutters and flail type choppers.

In the field of farm implements, it has been the general practice to provide each implement with its own hitching means, control linkages, and wheels. Although this practice has served the purpose the hitching means, control linkages, and wheels of any implement constitutes a large part of the cost of the implement, and because of the large number of implements farmers now have this cost is duplicated again and again.

The general purpose of this invention is to provide a farm implement suspension device that can be used to support many different farm implements.

Another purpose of this invention is to provide the suspension device with a protective shield, thus making the use of the farm implements safer.

An object of the present invention is the provision of a farm implement suspension device adapted to carry any of several farm implements.

Another object is to provide a farm implement suspension device having hydraulic means for controlling the position of the farm implement with respect to the suspension device.

A further object of the invention is the provision of a farm implement suspension device having a protective shield.

Still another object is to provide a farm implement suspension device with the protective shield made from a slotted elastomer sheet.

Yet another object of the present invention is the provision of a farm implement suspension device having a protective shield comprising individual flexible fingers.

Still another object of the present invention is the provision of a protective shield for farm implements made from the side wall of a tire carcass.

These and other objects of the invention will become more apparent from the specification and drawings, wherein:

FIGURE 1 shows a front elevation of the suspension device having a protective shield mounted thereon;

FIGURE 2 shows a side elevation of the implement suspension device having a protective shield mounted thereon;

FIGURE 3 is a section view taken along lines 3—3 of FIGURE 1;

FIGURE 4 is a section view taken along lines 4—4 of FIGURE 1;

FIGURE 5 is a front elevation of the suspension device having a second embodiment of the protective shield mounted thereon;

FIGURE 6 is a sectional view taken along lines 6—6 of FIGURE 5;

FIGURE 7 is a side elevational view of the farm implement suspension device having the second embodiment of the protective shield mounted thereon; and FIGURE 8 is a sectional view taken along lines 8—8 of FIGURE 5.

Referring now to the drawings wherein like reference characters designate like or corresponding parts throughout the several views, there is shown in FIGURE 1 the implement suspension device comprising a frame chassis generally designated 9 which comprises hollow frame members 10 having downwardly extending rear portions 12 and downwardly extending forward portions 14, a forward transverse member 15, and a pair of transverse channel members 16 and 17. At the extremities of the downward extending rear portion of the hollow frame members 10 is mounted an axle 18 upon which is carried a pair of wheels 19. Hitching means 32 is mounted on the forward transverse frame member.

The implement mounting means include a forward shaft 20 and a rearward shaft 21 mounted in said transverse channel members 16 and 17. A pair of arms 23 are secured to said shafts and extend upwardly therefrom through slots 22 formed in the hollow frame members 10. The arm 23 of the rear shaft is connected to the arm 23 of the forward shaft by connecting link 24 which is pivotally secured to the ends of each of said arms. An arm 25 is secured to and extends downwardly from each end of shafts 20 and 21. Shaft 21 has a lever arm 30 secured thereto extending upwardly therefrom which is controlled by a piston actuator 31, said actuator being under the control of the operator.

In FIGURE 2, a rotary-type cutter 26 is shown mounted on the implement supporting device. The housing of said rotary type cutter is provided with four lugs 27 which are pivotally secured to the arms 25 of the implement mounting means. As an additional guide or support the hollow frame members 10 are provided with lugs 29 which are connected to the housing of the rotary cutter by pivoted links 28.

In FIGURES 1 to 4, inclusive, is shown one embodiment of a protective shield 40. Said shield 40 is mounted on the implement suspension device by tubes 41 which extend downwardly from the forward transverse member 15. The protective shield comprises a horizontal bar 44 which extends beyond the width of the implement suspension device and includes rearwardly extending portions 45. Extending upwardly from said horizontal bar are extension tubes 42 which are adapted to be telescoped within the tubes 41 and secured thereto by nuts and bolts 43. The protective shield of this embodiment comprises slotted resilient sheets having fingers 49 formed therein, said sheets 48 being mounted to said horizontal bar 44. The resilient sheets of this embodiment have been made from the side walls of tire carcasses, as can be seen in FIGURE 3. By this construction, several advantages have been attained, one being that when the implement suspension device is pulled forward, because of the rearward slope of the lower edge of the resilient sheet, it tends to ride over obstructions in the terrain easily. On the other hand, because of the cup-shaped configuration of the inner surface of the resilient sheet, the sheet tends to catch objects being thrown from the working area of the implements. The cup-shape configuration also permits the fingers to be deflected inwardly as a result of less force than is required to deflect them outwardly, which is advantageous because they can ride over obstructions and still be rigid enough to stop objects being thrown by the implement. By constructing the resilient shield from tire carcasses a relatively light sheet made from a high-grade reinforced rubber that is available in large quantities has been provided. Slotting this sheet to form fingers 49 allows one portion of this sheet to be bent back while other portions remain in the vertical position and the resiliency of the rubber tends to return the fingers to the vertical position as soon as possible.

In FIGURES 5 to 8, inclusive, a second embodiment of the protective resilient shield is illustrated. In this embodiment a horizontal bar 54 having a circular cross section, as seen in FIGURE 8, having extension members 52 is mounted on the tubes 51 of the forward transverse frame member 15 by nuts and bolts 53. The horizontal bar 54 extends beyond both sides of the implement suspension device and is then bent back to form rearwardly extending portions 55. A plurality of open bands 56 are loosely mounted on the horizontal bar 54, each of said bands supporting a strip 57 on a nut and bolt 58. The upper portions of strip 57 are enlarged to reinforce it around its mounting aperture and also to space the strips a given distance apart on the horizontal bar. Since the bands are loosely mounted on the horizontal bar 54, the strips can swing forward and backward about the horizontal bar. Also, since the strips are mounted on the bands by a bolt extending through an aperture in the upper portion of these strips they are free to swing from side to side. The swinging motion of strips 57 about the two axes can be best visualized by considering FIGURE 8. In FIGURE 7, the rotary type cutter has been provided with pivoted links 67 which could be utilized rather than the lugs 27 shown in FIGURE 2. The resilient strips 57 shown in FIGURES 5 to 8 are made from the side wall of tire carcasses and thus the advantage pointed out above is attained in this embodiment also.

To mount the farm implement on the implement suspension device, the suspension device is located over the implement and the lugs 27 of FIGURE 2 or the links 67 of FIGURE 7 are then fixed to arms 25 of the implement mounting means. The implement suspension device carrying the implement is then hitched in the conventional way to a power means such as a farm tractor. Since the protective shield extends across the entire front of the suspension device and outwardly beyond the wheels, the horizontal bar of said protective device acts as a bumper to bend saplings, tall weeds, and the like, such that they will be directed under the implement and will not become tangled between the wheels and the frame of the suspension device. The resilient sheet of the protective shield will function to comb and smooth out the material over which it is pulled leaving it in better condition to be worked by the implement. However, the main function of the resilient sheet is to stop foreign material that is being thrown from the implement. Material such as stones and sticks are often thrown from implements such as rotary type cutters and thus create a dangerous condition in the vicinity of such implements. The driver of the tractor and the tractor itself are in a particularly hazardous location since the blades of most harvesting implements tend to throw foreign material forwardly from the implement. By extending the protective shield beyond the edges of the suspension device and then providing rearwardly extending portions on the shield a protective zone covering a wide arc is provided. By utilizing the side walls of tire carcasses a protective sheet having a concave inner surface which is adapted to catch foreign matter is provided. Of course, if it is deemed necessary, a protective shield of the same type could be provided for the sides and rear of the implement suspension device.

Thus it is seen that an implement suspension device adapted to carry a plurality of farm implements and including a protective shield has been provided.

It should be understood, of course, that the foregoing disclosure relates to only preferred embodiments of the invention and that numerous modifications and alterations may be made therein without departing from the spirit and scope of the invention as set forth in the appended claim.

What is claimed is:

A protective shield for farm implements comprising a bar having mounting means thereon, a resilient shield mounted on said bar, said resilient shield comprises a plurality of individual resilient elastomer strips having a laterally extending enlarged mounting portion located at one end thereof that functions to reinforce said strips and also to space the strips from each other, a mounting aperture formed centrally of said mounting portion, a plurality of bands carried by said bar, and means extending through said apertures for pivotally connecting said elastomer strips to said bands.

References Cited in the file of this patent

UNITED STATES PATENTS

| | | |
|---|---|---|
| 2,741,043 | Lindbeck | Apr. 10, 1956 |
| 2,769,295 | Northcote | Nov. 6, 1956 |
| 2,928,223 | Danuser | Mar. 15, 1960 |
| 2,963,842 | Estes | Dec. 13, 1960 |
| 2,969,119 | Barry | Jan. 24, 1961 |
| 3,027,701 | Campbell | Apr. 3, 1962 |
| 3,063,226 | Pfauser | Nov. 13, 1962 |

FOREIGN PATENTS

| | | |
|---|---|---|
| 215,528 | Australia | Sept. 26, 1957 |